(12) United States Patent
Reynolds

(10) Patent No.: US 7,781,514 B2
(45) Date of Patent: Aug. 24, 2010

(54) MICROSPHERES AS THICKENING AGENTS FOR ORGANIC PEROXIDES

(75) Inventor: Jeffrey Andrew Reynolds, Cincinnati, OH (US)

(73) Assignee: Illinois Tool Works Inc., Glenview, IL (US)

( * ) Notice: Subject to any disclaimer, the term of this patent is extended or adjusted under 35 U.S.C. 154(b) by 977 days.

(21) Appl. No.: 11/417,231

(22) Filed: May 3, 2006

(65) Prior Publication Data

US 2007/0010609 A1  Jan. 11, 2007

Related U.S. Application Data

(63) Continuation-in-part of application No. 11/178,652, filed on Jul. 11, 2005, now Pat. No. 7,550,532.

(51) Int. Cl.
*C08L 67/00* (2006.01)

(52) U.S. Cl. .................. 524/599; 524/601; 524/603; 524/604; 524/605; 524/608

(58) Field of Classification Search ................ 524/599, 524/601, 603, 604, 605, 608
See application file for complete search history.

(56) References Cited

U.S. PATENT DOCUMENTS

| | | | |
|---|---|---|---|
| 2,967,756 A | 1/1961 | Mazzucchelli et al. | |
| 3,051,679 A | 8/1962 | Forsyth | |
| 3,737,027 A | 6/1973 | Ball | |
| 3,919,348 A | 11/1975 | Foster et al. | |
| 4,038,339 A | 7/1977 | Foster | |
| 4,071,489 A | 1/1978 | Emmons et al. | |
| 4,263,198 A | 4/1981 | Feldman et al. | |
| 4,310,644 A | 1/1982 | Miley | |
| 4,600,738 A | 7/1986 | Lamm et al. | |
| 4,867,989 A | 9/1989 | Silva et al. | |
| 5,880,181 A | 3/1999 | Torenbeek et al. | |
| 5,907,018 A * | 5/1999 | Mazurek et al. | 525/477 |
| 6,821,569 B2 | 11/2004 | Okada et al. | |
| 7,378,455 B2 | 5/2008 | Lu et al. | |
| 2003/0027903 A1 | 2/2003 | Nwoko et al. | |
| 2003/0035917 A1* | 2/2003 | Hyman | 428/67 |
| 2004/0092630 A1 | 5/2004 | Nwoko et al. | |
| 2007/0010608 A1 | 1/2007 | Reynolds | |
| 2007/0265385 A1 | 11/2007 | Reynolds | |

FOREIGN PATENT DOCUMENTS

| | | |
|---|---|---|
| GB | 729 780 A | 5/1955 |
| RU | 2 237 689 C2 | 10/2004 |
| WO | 9954393 A1 | 10/1999 |
| WO | WO02/088249 A2 | 11/2002 |
| WO | 2007005280 A2 | 1/2007 |

OTHER PUBLICATIONS

Notice of Allowance dated Dec. 22, 2009 pertaining to U.S. Appl. No. 12/329,867.
Notice of Allowance dated Jan. 5, 2010 pertaining to U.S. Appl. No. 11/779,340.
Notice of Allowance for U.S. Appl. No. 12/329,867 dated Sep. 17, 2009.
Notice of Allowance for U.S. Appl. No. 11/779,340 dated Sep. 17, 2009.
Examination Report pertaining to Australian patent application No. 2006269216 dated Sep. 8, 2009.
Official Action pertaining to Canadian Application No. 2,614,745 dated Aug. 5, 2009.
International Search Report pertaining to International application No. PCT/US2006/026650 dated Jan. 19, 2007.
International Preliminary Report on Patentability pertaining to International application No. PCT/US2006/026650 dated Jan. 16, 2008.
International Search Report pertaining to International application No. PCT/US2007/008179 dated Sep. 24, 2007.
International Preliminary Report on Patentability pertaining to International application No. PCT/US2007/008179 dated Nov. 4, 2008.
International Search Report and Written Opinion pertaining to International application No. PCT/US09/62001 dated Nov. 24, 2009.
Official Action dated Dec. 17, 2009 pertaining to corresponding Russian Application No. 2008147642.

* cited by examiner

*Primary Examiner*—Bernard Lipman
(74) *Attorney, Agent, or Firm*—Dinsmore & Shohl LLP

(57) ABSTRACT

A method of making a thickened hardener composition useful in a two part resin system. The thickened hardener composition includes a carrier, a peroxide catalyst, and a thickening and volumetrically increasing agent, wherein the thickening and volumetrically increasing agent is microspheres. A method of making a thermoset resin from a two-part polyester resin system is also provided.

36 Claims, No Drawings

MICROSPHERES AS THICKENING AGENTS FOR ORGANIC PEROXIDES

This application is a continuation-in-part of U.S. application Ser. No. 11/178,652, filed Jul. 11, 2005 now U.S. Pat. No. 7,550,532, entitled Polyester Resin Composition.

FIELD OF THE INVENTION

The present invention relates to polyester resins and their use in primers, body fillers, adhesives, and putties that are used in repairs and surface finishing for metal and plastic substrates for architectural uses and construction, and for equipment and vehicles such as automotive, marine, agricultural and airborne vehicles, and industrial equipment.

BACKGROUND OF THE INVENTION

Traditionally, the polyester repair markets have utilized well-defined processes in the area of damage repair. Unsaturated polyester resins, primers, fillers, adhesives, or putties are used to resurface and reshape damaged areas. For ease of understanding, the term "resin" will be used in the following description; however, it is to be understood that the term includes cured resins and prepolymers (uncured resins), primers, fillers, adhesives, and putties. The method for catalyzation and application of the resin is as much an art as it is a science. This is due in part to the very small amount of peroxide hardener (catalyst) that is used to cure the much larger amounts of unsaturated polyester resin properly. The optimum peroxide level needed to cure the resin is generally about 1 to 3 parts per hundred of the resin by weight. The resin and peroxide are packaged in separate containers, typically a large can for the filler (8 oz. to 55 gal.), and a small tube for the peroxide catalyst (0.25 oz. to 4 oz.).

The user dispenses a variable amount of resin into a cup or onto a mixing board, and adds the peroxide catalyst, essentially guessing at the correct amount for proper catalyzation. The consequences of improper catalyzation of the resin include loss of adhesion to the substrate, uncured surface (tacky), cracking of the resin due to excessive heat generation, migration of uncured resin organics to subsequent coatings resulting in discoloration of top coats, outgassing of uncured material in the presence of ultraviolet or heat energy from sunlight or paint baking systems resulting in blistering and other damage to the topcoat, as well as other problems that may require removal and replacement of the repair.

As a result, efforts have been made to control metering of the organic peroxide to ensure that the proper amount is mixed with the thermoset resin. Due to the nature of many of the commercially available peroxide solutions, which have a viscosity similar to water, dispensing in a mechanical metering system was difficult in non-spray applications. One attempt to solve this problem is described in U.S. Pat. No. 5,880,181, which disclosed organic peroxides in combination with a cellulose ester as a thickening agent, and a fumed silica and/or a hydrogenated castor oil as a thixotropic agent to form a thicker form of the organic peroxide.

There remains a need in the art for a more volumetrically controllable form of the organic peroxide.

SUMMARY OF THE INVENTION

The present invention meets this need by providing a method of making a thickened hardener composition useful in a two part resin system. The method includes providing a carrier; providing a peroxide catalyst; and adding a thickening and volumetrically increasing agent, wherein the thickening and volumetrically increasing agent are microspheres; and mixing the carrier, the organic peroxide, and the thickening and volumetrically increasing agent to form the thickened hardener composition.

Another aspect of the invention is a method of making a thermoset resin from a two-part polyester resin system. The method includes providing thickened hardener composition comprising: providing a carrier; providing a peroxide catalyst; and adding a thickening and volumetrically increasing agent, wherein the thickening and volumetrically increasing agent is microspheres; mixing the carrier, the organic peroxide, and the thickening and volumetrically increasing agent to form the thickened hardener composition; providing a resin composition comprising a reactive polymer, a reactive monomer, or combinations thereof; mixing the thickened hardener composition and the resin composition in a ratio of about 1:10 to about 1:2; and curing the mixture to the form the thermoset resin.

DETAILED DESCRIPTION OF THE INVENTION

The present invention involves a polyester primer, resin, filler, adhesive, or putty that can be applied to metal substrates, such as cold rolled steel, galvanized steel, and aluminum, as well as to plastic substrates, such as polyesters, polyurethanes, polyolefins, sheet molding compounds (SMC), and bulk molding compounds (BMC).

The invention makes use of microspheres as a thickener and volumetrically increasing agent. The use of the microspheres allows for the manipulation of the volumetric ratio of the peroxide dispersion side in relation to the resin side.

The ability to measure the mix ratio of catalyst to resin accurately will reduce or eliminate the most common problems associated with unsaturated polyester repair product use, and will increase the value of the product to the user.

The microspheres can be glass, plastic, or ceramic, as desired. The microspheres add volume while lowering density. The lower density has performance and distribution benefits. A composition containing microspheres can be sanded easily because the sanding is cutting through mostly air. Less dense putties also have better sag resistance on vertical surfaces. In terms of distribution, lighter products are less expensive to ship.

Glass microspheres have an advantage due to their ease of sanding. They also have very low oil absorption, decreasing resin contribution, and lowering costs. The low oil absorption also provides unique and desirable flow characteristics.

The size and density of microspheres can vary widely. Some are relatively large and light at about 0.13 g/cc, such as K-1 3M Scotchlite™ glass bubbles available from 3M, or Q-Cel 6014 available from Potters Industries Inc., while others are smaller and heavier at about 0.6 g/cc, such as S-60 3M Scotchlite™ glass bubbles available from 3M, or 60P18 available from Potters Industries Inc. Because of the size and density variations, the total weight range of the microspheres in the peroxide dispersion can vary from about 1% for the larger, lighter microspheres, to about 50% for the smaller heavier microspheres.

The present invention can include either a non-reactive carrier or a reactive carrier. Non-reactive carriers include, but are not limited to plasticizers for peroxides. Examples of plasticizers include, but are not limited to, benzoate plasticizers, phthalate plasticizers, and short chain saturated polyesters. Suitable phthalate plasticizers include, but are not limited to, dimethyl phthalate, diethyl phthalate, dibutyl phthalate, diisobutyl phthalate, butyl benzyl phthalate, and combinations thereof. The plasticizer can be purchased in combination with the peroxide catalyst. Examples of products containing both plasticizers and peroxide catalysts include, but are not limited to, those available from Akzo Nobel under the designation Perkadox BTW-50, from Norac under the designation Benox B-50, and a 50% Benzoyl Peroxide Paste available from Catalyst Systems.

The use of a reactive carrier greatly increases the challenge of stabilization of the blend. It will be a reactive component in the system, but it can be stabilized in the presence of the catalyst alone. Suitable reactive carriers include, but are not limited to low molecular weight non-styrenated unsaturated polyesters, diglycidal ether bis-phenol A based epoxies, and bis-phenol A alkoxylates. Suitable low molecular weight non-styrenated unsaturated polyesters include, but are not limited to, short chain unsaturated aliphatic dicarboxylic acid based polyesters. Suitable short chain unsaturated aliphatic dicarboxylic acid based polyesters include, but are not limited to, maleates and fumarates with a viscosity in the range of about 100 to about 10,000 cps, generally about 100 to about 2,000.

Suitable peroxide catalysts include, but are not limited to, ketone peroxides, cumyl hydroperoxides, dibenzoyl peroxides, peroxyesters, peroxyketals, and peroxydicarbonates. Suitable ketone peroxides include, but are not limited to, methyl ethyl ketone peroxide, 2,4-pentadione peroxide, methyl isobutyl ketone peroxide, acetyl acetone peroxide, cyclohexanone peroxide.

The hardener side can also include fillers such as talcs, carbonates, pigments, rheological modifiers, pigment wetting and dispersing agents, parrafins, and fiber reinforcements.

The resin side of the system can include a reactive polymer, or a monomer, or a combination of the two. Suitable reactive polymers include, but are not limited to, unsaturated polyesters, vinyl esters, and hybrid epoxy-polyester, hybrid urethane-polyester, and hybrid acrylate-polyester systems that polymerize by way of a free radical mechanism. Suitable monomers include, but are not limited to, styrene, vinyl toluene, other methyl styrene monomers, methyl methacrylate, and other acrylate monomers.

The resin side can also include fillers such as talcs, carbonates, pigments, rheological modifiers, microspheres, pigment wetting and dispersing agents, paraffins, and fiber reinforcements.

The microspheres can be included in the hardener side so that the volume of the hardener and resin compositions are approximately the same. The ratio of the volume of the hardener side to the volume of the resin side is generally about 1:10 to about 1:1, typically about 1:10 to about 1:2. With the volume ratio in this range, it is much easier to provide the correct amount of hardener for the amount of resin used, eliminating the guesswork of prior art systems.

Controlling the volume of each side will allow the use of a variety of mixing tube applicators. One example of mixing tube applicator is a double barrel mixing tube applicator which has the hardener composition on one side and the resin composition on the other side. The plunger dispenses the hardener composition and resin composition in the proper amounts so that they can be mixed and applied.

Another suitable mixing tube applicator is a "universal cartridge." The universal cartridge incorporates both sides of the product in a single barrel. It uses a front and back chambers with a transfer tube from the back to deliver both sides in the correct ratio. The benefit of a universal cartridge is the ability to use it with any caulk gun, instead of specific side by side guns. Suitable universal cartridge delivery systems are described in U.S. Pat. Nos. 5,310,091 and 6,938,797.

In order that the invention may be more readily understood, reference is made to the following examples which are intended to illustrate the invention, but not limit the scope thereof.

EXAMPLE 1

This test was designed to test the effect of soda lime borosilicate microspheres on the hardener composition. The use of glass microspheres allowed large volumetric increases to the hardener composition in relation to the resin composition of the two-part system. The reactive carrier was short chain dipropylene glycol (DPG) maleate that is non-diluted with monomer, the catalyst was Benzoyl Peroxide (50%), antioxidant 1 was 2,6-di-tertiary-butyl-n,n-dimethylamino-paracresol, and antioxidant 2 was 2,6-di-tertiary-butyl-paracresol.

| Raw Material | A | B | C | D | E | F |
| --- | --- | --- | --- | --- | --- | --- |
| Reactive Carrier | 73.7 | 66.6 | 66.6 | 66.6 | 66.6 | 66.6 |
| Microspheres | 15.8 | 16.7 | 16.7 | 16.7 | 16.7 | 16.7 |
| Benzoyl Peroxide (50% paste) | 10.5 | 16.7 | 16.7 | 16.7 | 16.7 | 16.7 |
| 1,4 NQ Soln | | | | $1.5 * 10^{-3}$ | $1.5 * 10^{-3}$ | |
| Antioxidant 2 | | | $2.5 * 10^{-3}$ | $2.5 * 10^{-3}$ | $5.0 * 10^{-3}$ | $5.0 * 10^{-3}$ |
| Antioxidant 1 | | | $1.5 * 10^{-3}$ | $1.5 * 10^{-3}$ | $1.5 * 10^{-3}$ | $1.5 * 10^{-3}$ |
| Total | 100 | 100 | 100 | 100 | 100 | 100 |
| Shelf Stability | >90 days | >90 days | >330 days | >330 days | >330 days | >330 days |

Samples maintained at ambient temperature.

All values representative of percentage by weight of the peroxide dispersion.

The results showed that the peroxide could be stabilized in a non-diluted low viscosity unsaturated polyester resin in the presence of microspheres.

EXAMPLE 2

Typical sample formulations for different mix ratios are shown.

| | 1:10 | 1:4 | 1:2 | 1:1 |
| --- | --- | --- | --- | --- |
| Resin Composition | | | | |
| Styrenated Unsaturated Polyester Resin | 43.74 | 35.23 | 28.28 | 24.33 |

-continued

|  | 1:10 | 1:4 | 1:2 | 1:1 |
|---|---|---|---|---|
| Monomer | 8.75 | 12.92 | 16.06 | 17.92 |
| Wax | 0.07 | 0.07 | 0.07 | 0.07 |
| Tetrahydrophthalic acid | 1.94 | 1.88 | 1.81 | 1.77 |
| TiO$_2$ | 2.43 | 2.35 | 2.26 | 2.21 |
| Rheological Modifier | 0.49 | 0.47 | 0.45 | 0.44 |
| Microtalc | 13.37 | 12.92 | 12.44 | 12.16 |
| Calcium Carbonate | 12.15 | 11.75 | 11.34 | 11.06 |
| Microspheres | 8.51 | 5.87 | 4.52 | 1.66 |
| Hardener Composition |  |  |  |  |
| Reactive Carrier | 4.86 | 11.74 | 16.97 | 19.91 |
| Microspheres | 1.22 | 2.35 | 3.39 | 6.08 |
| Benzoyl Peroxide (50% paste) | 2.43 | 2.35 | 2.26 | 2.21 |
| Antioxidant 1 | 0.01 | 0.02 | 0.03 | 0.04 |
| Antioxidant 2 | 0.03 | 0.08 | 0.12 | 0.14 |
| Total | 100.00 | 100.00 | 100.00 | 100.00 |

All values are representative of percent by weight of the total composition (peroxide dispersion and resin).

EXAMPLE 3

This example was designed to test how gel times were affected by the amount of reactive carrier. The resin promoter was N-(2-Hydroxyethyl)-N-methyl-para-toluidine.

| Resin Composition | 2:1 | 4:1 |
|---|---|---|
| Unsaturated Polyester | 90 | 120 |
| Unsaturated Polyester | 40 | 40 |
| Styrene Monomer | 49 | 39 |
| Wax Soln. 33% | 9 | 9 |
| Tetrahydrophthalic acid | 8 | 8 |
| TiO$_2$ | 10 | 10 |
| Resin Promoter | 0.5 | 0.5 |
| Rheological Modifier | 2 | 2 |
| Talc | 55 | 55 |
| Calcium Carbonate | 50 | 50 |
| S-22 Microspheres | 20 | 25 |
|  | 333.5 | 358.5 |

| Peroxide Composition |  |  |
|---|---|---|
| Low MW Non-Styrenated Polyester | 70 | 40 |
| Benzoyl Peroxide (50% paste) | 10 | 10 |
| S-22 Microspheres | 15 | 10 |
|  | 95 | 60 |
| Gel Times | 5.0 | 3.33 |

All values are representative of gram weight of the total composition (peroxide composition and resin composition).

With the use of a promoter and manipulation of the inhibiter level, the gel and cure rates can be customized for a particular application.

EXAMPLE 4

The stability of the peroxide catalyst was evaluated using various antioxidants and inhibitors. NQ solution is 10% 1,4-Naphthaquinone (inhibitor)/90% methanol.

| Peroxide Composition | 1 | 2 | 3 | 4 |
|---|---|---|---|---|
| Low MW Non-Styrenated Polyester | 33.3 | 33.3 | 33.3 | 33.3 |
| Benzoyl Peroxide (50% paste) | 8.3 | 8.3 | 8.3 | 8.3 |
| S-22 Microspheres | 8.3 | 8.3 | 8.3 | 8.3 |
| Antioxident 2 | 0.125 | 0.125 | 0.25 | 0.25 |
| Antioxidant 1 | 0.075 | 0.075 | 0.075 | 0.075 |
| NQ Soln |  | 0.075 |  | 0.075 |
| Gel Times | 14.0 | 12.0 | 28.0 | 22.0 |
| Gel Time After 1 Year |  | 9.0 |  | 14.0 |

All values are representative of gram weight of the total composition (peroxide composition).

Samples 1-4 were placed in an oven at 110° F. The samples gelled in two weeks. Samples maintained at ambient temperature (68-78° F.) remained gel free for over 1 year.

After 1 year, the gel time was retested for Samples 2 and 4. The gel time dropped from 12 to 9 minutes for Sample 2, and it dropped from 22 to 14 minutes for Sample 4. This indicates that the inhibitors and antioxidants have been partially consumed.

EXAMPLE 5

This example was designed to determine whether the performance characteristics of existing peroxide catalyzed products could be matched by embodiments of the invention. A low molecular weight non-styrenated polyester with a resin promoter and a benzoyl peroxide (50%) catalyst were blended with a styrenated resin without the other typical components being present.

|  | Styrenated Polyester | | | | Resin |
|---|---|---|---|---|---|
| Low MW Non-Styrenated Polyester | 50% | 60% | 70% | 90% | Promotor |
| 50% | 5'30" |  |  |  |  |
| 40% (2 + 1) |  | 4'00" |  |  |  |
| 40% (2 + 1) |  | 1'00" |  |  | 0.6% |
| 30% (4 + 1) |  |  | 3'40" |  |  |
| 30% (4 + 1) |  |  | 1'00" |  | 0.5% |
| 10% (10 + 1) |  |  |  | 3'00" |  |
| 10% (10 + 1) |  |  |  | 1'00" | 0.4% |

All values representative of percentage by weight of the resin blend.

All samples catalyzed at 4% by weight benzoyl peroxide (50% paste dispersion).

The gel times for different polyester blends were measured. The addition of a promoter succeeded in decreasing the gel time to the desired 1 minute time for various blend ratios.

Suitable 2:1, 4:1, and 10:1 formulations corresponding to the above experiment are shown below.

| Resin Composition | 2:1 | 4:1 | 10:1 |
|---|---|---|---|
| Styrenated Polyester | 250 | 300 | 360 |
| Styrene | 110 | 110 | 110 |
| Wax Soln. 33% | 1.0 | 0.8 | 0.6 |
| Tetrahydrophthalic acid | 16 | 16 | 16 |
| TiO$_2$ | 20 | 20 | 20 |
| Rheological Modifier | 4 | 4 | 4 |
| Talc | 110 | 110 | 110 |
| Calcium Carbonate | 100 | 100 | 100 |
| S-22 Microspheres | 40 | 50 | 65 |

| Peroxide Composition | | | |
|---|---|---|---|
| Low MW Non-Styrenated Polyester | 150 | 100 | 40 |
| Benzoyl Peroxide (50% paste) | 20 | 20 | 20 |
| S-22 Microspheres | 30 | 20 | 5 |

All values are representative of gram weight of the total composition (peroxide composition and resin composition).

EXAMPLE 6

A hardener composition was prepared according to the following formulation. The base composition was then mixed with microspheres in order to evaluate the effect of different microspheres. Antioxidant 2 solution was 10% antioxidant 2, and 90% low molecular weight non-styrenated unsaturated polyester. Antioxidant 2 solution was 50% antioxidant 1, and 50% methanol.

| Hardener Composition | | 1 | 2 | 3 | 4 | 5 |
|---|---|---|---|---|---|---|
| Low MW Non-Styrenated Polyester | 300 | | | | | |
| DiGlycidal Ether Bisphenol A Epoxy | 100 | | | | | |
| Benzoyl Peroxide (50% paste) | 300 | | | | | |
| Antioxidant 2 soln | 20 | | | | | |
| Antioxidant 1 soln | 6 | | | | | |
| Premix Total | 726 | 140 | 140 | 140 | 140 | 140 |
| Precipitated Silica Thickening Agent | | 5 | 5 | | | |
| Fumed Silica Thickening Agent | | | | 2.5 | 2.5 | |
| 60P18 Microspheres | | 20 | | 20 | | |
| S-60 Microspheres | | | 20 | | 20 | |
| | | 165 | 165 | 162.5 | 162.5 | 140 |
| Gel Time 10 to 1 with lightweight polyester body filler | | 11:00 | 11:20 | 11:10 | 11:05 | 11:05 |

All values are representative of gram weight of the total composition (peroxide composition and resin composition).

The use of different microspheres did not impact the gel time. The gel time of examples 1-4 was comparable to that of a hardener without silica thickening agent or microspheres.

EXAMPLE 7

This was designed to test the high temperature stability of hardener containing the microspheres in cartridges. The peroxide was a ketone peroxide, 2,4 pentadione peroxide, and antioxidant 3 was 15% aqueous N-isopropylhydroxylamine solution.

| Hardener Composition | 1 | 2 | 3 |
|---|---|---|---|
| Low MW Non-Styrenated Polyester | 30 | 40 | 40 |
| DiGlycidal Ether Bisphenol A Epoxy | 10 | | |
| Peroxide | | 30 | 30 |
| Benzoyl Peroxide (50% paste) | 30 | | |
| Antioxidant 2 | 0.273 | | |
| Antioxidant 1 | 0.1 | | |
| Antioxidant 3 | 0.05 | | |
| 60P18 Microspheres | 15 | 15 | |
| Precipitated Silica | 5 | 5 | |
| 120° F. Stability | 90.423 7 days | 90.0 | 90.0 |

All values are representative of gram weight of the total composition.

The filled ketone peroxide samples did not show decomposition, but did have outgassing after 3 days at 120° F. This may have been due to solvents present in the ketone peroxide formula from the supplier which escaped at high pressure.

Peroxides are extremely temperature sensitive. However, the relationship between temperature and decomposition is not linear. At room temperature (68-78° F.), peroxide dispersions containing reactive carrier and/or non-reactive carriers with microspheres as the thickening and volumetrically increasing agent have been stable for over one year. At 100° F., they have been stable for several months, while at 120° F., gelling occurred in about 14 to 16 days.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a thickened hardener composition useful in a two part resin system comprising:
    providing a carrier;
    providing a peroxide catalyst; and
    adding a thickening and volumetrically increasing agent, wherein the thickening and volumetrically increasing agent is microspheres;
    mixing the carrier, the organic peroxide, and the thickening and volumetrically increasing agent to form the thickened hardener composition, wherein the thickened hardener composition is stable at room temperature for over one year.

2. The method of claim 1, wherein the carrier comprises a reactive carrier.

3. The method of claim 2, wherein the reactive carrier is selected from low molecular weight non-styrenated unsaturated polyesters, diglycidal ether bis-phenol A based epoxies, bis-phenol A alkoxylates, or combinations thereof.

4. The method of claim 3, wherein the reactive carrier is the low molecular weight non-styrenated unsaturated polyesters selected from short chain unsaturated aliphatic dicarboxylic acid based polyesters.

5. The method of claim 4, wherein the short chain unsaturated aliphatic dicarboxylic acid based polyesters are selected from maleate based polyesters or fumarate based polyesters.

6. The method of claim 5, wherein the maleate based polyester or the fumarate based polyester has a viscosity in a range of from about 100 to about 10,000 cps.

7. The method of claim 1, wherein the carrier comprises a non-reactive carrier.

8. The method of claim 7, wherein the non-reactive carrier comprises a plasticizer for peroxides.

9. The method of claim 8, wherein the plasticizer is selected from phthalate plasticizers, benzoate plasticizers, short chain saturated polyesters, or combinations thereof.

10. The method of claim 1, wherein the peroxide catalyst is selected from ketone peroxides, cumyl hydroperoxides, dibenzoyl peroxides, peroxyesters, peroxyketals, and peroxydicarbonates.

11. The method of claim 10, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide.

12. The method of claim 1, wherein the thickened hardener composition further comprises at least one filler selected from talcs, carbonates, pigments, rheological modifiers, pigment wetting and dispersing agents, paraffins, fiber reinforcements, or combinations thereof.

13. A method of making a thermoset resin from a two-part polyester resin system comprising:
providing thickened hardener composition comprising:
providing a carrier;
providing a peroxide catalyst; and
adding a thickening and volumetrically increasing agent, wherein the thickening and volumetrically increasing agent is microspheres;
mixing the carrier, the organic peroxide, and the thickening and
volumetrically increasing agent to form the thickened hardener composition;
providing a resin composition comprising a reactive polymer, a reactive monomer, or combinations thereof;
mixing the thickened hardener composition and the resin composition in a ratio of about 1:10 to about 1:2; and
curing the mixture to the form the thermoset resin.

14. The method of claim 13, wherein the carrier comprises a reactive carrier.

15. The method of claim 14, wherein the reactive carrier is selected from low molecular weight non-styrenated unsaturated polyesters, diglycidal ether bis-phenol A based epoxies, bis-phenol A alkoxylates, or combinations thereof.

16. The method of claim 15, wherein the reactive carrier is the low molecular weight non-styrenated unsaturated polyesters selected from short chain unsaturated aliphatic dicarboxylic acid based polyesters.

17. The method of claim 16, wherein the short chain unsaturated aliphatic dicarboxylic acid based polyesters are selected from maleate based polyesters or fumarate based polyesters.

18. The method of claim 17, wherein the maleate based polyester or the fumarate based polyester has a viscosity in a range of from about 100 to about 10,000 cps.

19. The method of claim 13, wherein the carrier comprises a non-reactive carrier.

20. The method of claim 19, wherein the non-reactive carrier comprises a plasticizer for peroxides.

21. The method of claim 20, wherein the plasticizer is selected from phthalate plasticizers, benzoate plasticizers, short chain saturated polyesters, or combinations thereof.

22. The method of claim 13, wherein the peroxide catalyst is selected from ketone peroxides, cumyl hydroperoxides, dibenzoyl peroxides, peroxyesters, peroxyketals, and peroxydicarbonates.

23. The method of claim 22, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide.

24. The method of claim 13, wherein the thickened hardener composition further comprises at least one filler selected from talcs, carbonates, pigments, rheological modifiers, pigment wetting and dispersing agents, paraffins, fiber reinforcements, or combinations thereof.

25. The method of claim 13, wherein the resin composition further comprises at least one filler.

26. The method of claim 25, wherein the at least one filler is selected from talcs, carbonates, pigments, rheological modifiers, microspheres, pigment wetting and dispersing agents, paraffins, fiber reinforcements, or combinations thereof.

27. The method of claim 13, wherein the reactive polymer is selected from unsaturated polyesters, vinyl esters, hybrid epoxy-polyester systems, hybrid acrylate-polyester systems, hybrid urethane-polyester systems, or combinations thereof.

28. The method of claim 13, wherein the reactive monomer is selected from styrene monomers, vinyl toluene monomers, methyl styrene monomers, methyl methacrylate monomers, acrylate monomers, or combinations thereof.

29. The method of claim 13 wherein the thickened hardener composition and the resin composition are provided in a mixing tube applicator.

30. The method of claim 29 wherein the mixing tube applicator is selected from double barrel mixing tube applicator or a universal cartridge mixing tube applicator.

31. A hardener composition comprising:
a carrier;
a peroxide catalyst; and
a thickening and volumetrically increasing agent, wherein the thickening and volumetrically increasing agent is microspheres, wherein the hardener composition is stable at room temperature for over one year.

32. The hardener composition of claim 31, wherein the carrier is a reactive carrier selected from low molecular weight non-styrenated unsaturated polyesters, diglycidal ether bis-phenol A based epoxies, bis-phenol A alkoxylates, or combinations thereof.

33. The hardener composition of claim 32, wherein the carrier is the reactive carrier is the low molecular weight non-styrenated unsaturated polyesters selected from maleate based polyesters or fumarate based polyesters.

34. The hardener composition of claim 31, wherein the carrier is a non-reactive carrier selected from phthalate plasticizers, benzoate plasticizers, short chain saturated polyesters, or combinations thereof.

35. The hardener composition of claim 31, wherein the microspheres are present in an amount from about 1% to about 50% by weight of hardener composition.

36. The hardener composition of claim 31, wherein the microspheres have a density in a range of about 0.13 g/cc to about 0.6 g/cc.

* * * * *